W. J. PITT.
RIDING HARROW.
APPLICATION FILED OCT. 14, 1912.

1,098,296. Patented May 26, 1914.

Witnesses

Inventor
William J. Pitt.
By Fred B. Fetherstonhaugh
His Attorney.

UNITED STATES PATENT OFFICE.

WILLIAM J. PITT, OF TABER, ALBERTA, CANADA.

RIDING-HARROW.

1,098,296.  Specification of Letters Patent.  Patented May 26, 1914.

Application filed October 14, 1912. Serial No. 725,765.

*To all whom it may concern:*

Be it known that I, WILLIAM J. PITT, of Taber, in the Province of Alberta and Dominion of Canada, have invented new and useful Improvements in Riding-Harrows, of which the following is a full, clear, and exact description.

This invention relates to improvements in riding harrows, and the object is to provide means whereby the operator will be enabled to lift the various drags of the harrow independently in order to free the same from stubble and the like without leaving his seat or stopping the motion of the implement.

The device consists essentially of a drag harrow of any suitable construction provided with a riding attachment. The riding attachment is provided with a supplementary cross bar upon which are journaled levers, each having one arm connected to a drag slightly to the rear of the center thereof. The other arm of each bell-crank lever is connected to a hand lever located conveniently to the driver's seat.

Figure 1:
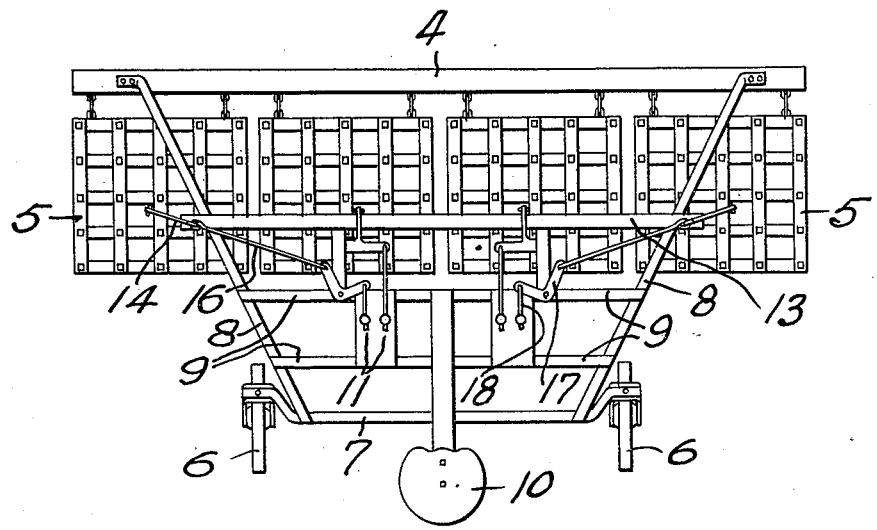
Figure 2:
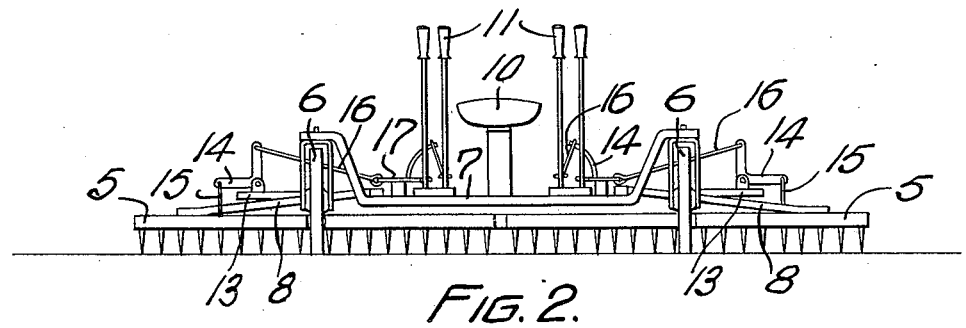
Figure 3:
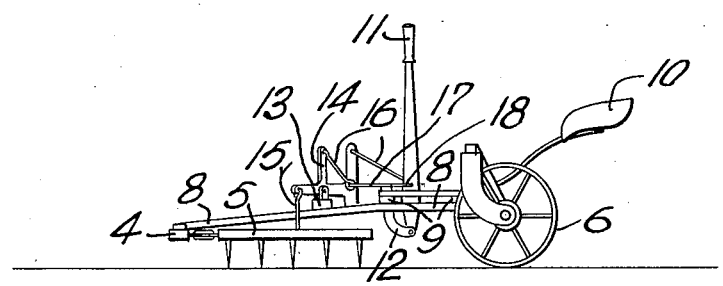

In the drawings which illustrate this invention:—Figure 1 is a plan view of the device. Fig. 2 is a rear elevation of same. Fig 3 is a side elevation.

Referring more particularly to the drawings, 4 designates the draft bar, and 5 the drags comprising the harrow. The riding attachment comprises a pair of wheels 6 mounted on an axle 7, which may be connected by reaches 8 to the draft bar 4. Suitable transverse braces 9 are provided to connect the reaches and to provide an attachment for the driver's seat 10.

In the present invention a plurality of hand levers 11 corresponding in number to the number of the drags are pivotally connected to brackets 12 or other suitable devices attached to the front brace 9. A supplementary cross bar 13 is supported by the reaches and is located a short distance behind the center of the drags. A plurality of bell-crank levers 14 are pivoted at suitable points on the bar 13 and are each connected at one extremity by a link 15 to a point slightly in the rear of the center of each drag 5. The opposite end of each bell-crank lever is connected by a link 16 with one of the hand levers 11. This connection may in some cases be direct, but in other cases, owing to the location of a drag being considerably to one side of the hand lever, it will be necessary to insert an additional bell-crank lever 17 having one of its arms connected to the link 16 and the other arm connected by a link 18 to the hand lever 11, as shown in the drawings. The operator will be enabled by pulling the levers 11 toward him to lift the drags separately, so that the teeth thereof come clear of the ground whereby branches, weeds, stubble and the like which may have been gathered up by the teeth of the drags will drop off, thus clearing the teeth and allowing them to sink their full depth into the ground. At the present time it is as a rule necessary to stop the horses, raise the drags singly and clear the teeth by hand, or else if the horses are kept in motion the drags must be lifted singly by hand, which operation is very inconvenient if not dangerous. In this invention the lifting connection is applied just slightly in the rear of the center of each drag in order that the maximum lift may be obtained with a comparatively small motion of the hand levers. It is obvious that the connection must be to the rear of the drag center, since if it was in front of the center, the weight of the draft bar and other drags attached thereto would either prevent the lifting of the drag or else make the operation very difficult. Furthermore, the lift of the front portion of the drag would not produce the required effect, since the front teeth of a drag harrow accumulate comparatively little rubbish as compared with the back teeth.

While a certain specific mechanism has been shown, the right is reserved to make such changes therein as do not depart from the spirit of the invention, which embodies, briefly, mechanism whereby the operator of a riding harrow may raise the drags independently to clear the same of rubbish by means of hand levers located adjacent his seat. A simplified form of the arrangement would be to fulcrum the levers over either the bar 9 or bar 13 and attach the forward ends to the drags by links, the rear ends being adjacent the driver's seat.

Having now described my invention, what I claim is:—

In a riding attachment for harrows, the combination with a harrow provided with a draft bar, of an axle provided with wheels arranged to the rear of said harrow, a seat carrying frame carried by said axle comprising diverging bars having their ends rigidly connected respectively to said draft bar and said axle, said bars being connected together intermediate their ends by braces, manually operated means for raising and lowering the drags independently, said means being connected to said drags, at a point slightly to the rear of the center of said drags.

In witness whereof I have hereunto set my hand in the presence of two witnesses.

WILLIAM J. PITT.

Witnesses:
   JNO. B. LYONS.
   ETHEL MARSHALL.

Copies of this patent may be obtained for five cents each, by addressing the "Commissioner of Patents, Washington, D. C."